United States Patent
Nadaf et al.

(10) Patent No.: US 10,361,909 B2
(45) Date of Patent: Jul. 23, 2019

(54) METHOD AND A SYSTEM FOR AUTOMATING AN ENTERPRISE NETWORK OPTIMIZATION

(71) Applicant: Tata Consultancy Services Limited, Mumbai (IN)

(72) Inventors: Shameemraj M Nadaf, Bangalore (IN); Hermant Kumar Rath, Bangalore (IN); Anantha Simha, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 870 days.

(21) Appl. No.: 13/846,228

(22) Filed: Mar. 18, 2013

(65) Prior Publication Data
US 2013/0254405 A1 Sep. 26, 2013

(30) Foreign Application Priority Data
Mar. 26, 2012 (IN) .......................... 807/MUM/2012

(51) Int. Cl.
*H04L 12/24* (2006.01)

(52) U.S. Cl.
CPC .......... *H04L 41/08* (2013.01); *H04L 41/0823* (2013.01); *H04L 41/145* (2013.01)

(58) Field of Classification Search
CPC ................................................. H04L 41/0843
USPC ....................................................... 709/226
See application file for complete search history.

(56) References Cited

U.S. PATENT DOCUMENTS

| | | | |
|---|---|---|---|
| 8,539,060 B2 * | 9/2013 | Zhang .................. | G06F 9/5094 709/223 |
| 2002/0059102 A1 | 5/2002 | Sung et al. | |
| 2004/0236547 A1 * | 11/2004 | Rappaport ............ | G06F 17/509 703/2 |
| 2006/0053094 A1 | 3/2006 | Ravi et al. | |
| 2007/0299745 A1 | 12/2007 | Haley et al. | |

(Continued)

OTHER PUBLICATIONS

Peng, J, et al., "On-demand Services Composition and Infrastructure Management," Grid and Cooperative Computing, Lecture Notes in Computer Science, 2004, vol. 3032, pp. 511-518.

(Continued)

*Primary Examiner* — Kevin T Bates
*Assistant Examiner* — Emad Siddiqi
(74) *Attorney, Agent, or Firm* — Finnegan, Henderson, Farabow, Garrett & Dunner LLP

(57) ABSTRACT

A method and system for optimizing a distributed enterprise information technology (IT) network infrastructure is disclosed, wherein the IT infrastructure comprises at least one server, at least one storage element, and at least one network element. The method comprises collecting data and arranging the collected data pertaining to an existing state of the information technology network infrastructure in a first set of templates. The method further comprises mapping the existing state and a new state of at least one of the at least one server and at least one storage element with an existing set of network elements using the first set of templates to form a second set of templates, wherein the method further comprises of planning the new state of the IT network infrastructure for transformation using the first set of templates and the second set of templates, the new state being an optimized state.

13 Claims, 2 Drawing Sheets

(56) References Cited

U.S. PATENT DOCUMENTS

| | | | |
|---|---|---|---|
| 2009/0201293 A1* | 8/2009 | Tung | G06F 1/3203 |
| | | | 345/440 |
| 2010/0042449 A1 | 2/2010 | Thomas | |
| 2010/0285788 A1* | 11/2010 | Epifani | H04W 24/02 |
| | | | 455/418 |
| 2010/0318658 A1* | 12/2010 | Zorn | G06F 9/5066 |
| | | | 709/226 |
| 2011/0022812 A1 | 1/2011 | van der Linden et al. | |
| 2012/0109719 A1* | 5/2012 | Parmar | G06Q 10/0637 |
| | | | 705/7.37 |
| 2012/0218917 A1* | 8/2012 | Komarevtsen | H04L 41/0843 |
| | | | 370/254 |

OTHER PUBLICATIONS

Wang, J., "Towards an Automatic IT Infrastructure Management Paradigm for Manufactory and Enterprise."
Graupner, Sven, I. Dr., "Architecture for the Automated Management of Data Center IT Infrastructure," Unviversität München (296 pages).

\* cited by examiner

METHOD AND A SYSTEM FOR AUTOMATING AN ENTERPRISE NETWORK OPTIMIZATION

CROSS-REFERENCE TO RELATED PATENT APPLICATION

The present application claims priority under 35 U.S.C. § 119 to Indian Patent Application No. 807/MUM/2012, filed Mar. 26, 2012. The aforementioned application is incorporated herein by reference in its entirety.

TECHNICAL FIELD

The present disclosure generally relates to optimization of data centers. More particularly the disclosure relates to a method and system for optimizing networks in data centers and transformation of the data centers for consolidation.

BACKGROUND

To support the consumer requirements, organizations across the information technology sector house big and complex IT infrastructure at different locations. These complexes, also known as data centers, comprise a variety of equipments such as plurality of servers, plurality of storages devices, various equipments such as telecommunication, networking, switch and other electronic equipment.

Introduction of new products or services, often flood the businesses with large number of consumers and their queries, making it necessary to refresh the infrastructure to meet the needs. However, the existing economic situation and challenges faced by a chief information officer (CIO) may not permit an organization to invest in refreshing the existing infrastructure.

One of the major challenges faced by a CIO is to run the IT operations both at organizational level and at data centers as a profit center rather than as a cost center as it accounts for 10-20% of total cost of ownership. To meet the challenge the CIO has to find a way by which he or she can consolidate multiple data centers to fewer ones, optimize the network infrastructure at the existing data centre, so that the cost of operations can be reduced. However, to dynamically optimize or transform the data centre or IT infrastructure, the CIO has to depend upon network vendors such as Cisco, Juniper to carry out necessary network related modifications.

Existing technologies, however, fail to disclose an efficient method and system for re-architecting the WAN/LAN/SAN. Another drawback observed is that present systems do not consider existing data to compute new infrastructure taking into account other changes happening in the infrastructure environment. Yet another drawback is that these systems have to be deployed in the customer network to collect data relating to data centre management.

Hence there is a need for techniques to eradicate dependency on vendor for network transformation and optimization, creation of a robust and scalable network infrastructure and reduction of cost both in terms of operations and ownership.

SUMMARY

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

The present disclosure may provide a method and system which uses constraint based optimization techniques to achieve WAN optimization, generate a topology map taking into account the new IT architecture post transformation, including the list of network components to be utilized, and perform both analysis of as-it-is state and transformed state i.e. to-be-states.

According to one aspect of the disclosure, a method and system for optimizing a distributed enterprise information technology (IT) network infrastructure is disclosed, wherein the IT infrastructure comprises at least one server, at least one storage element, and at least one network element. The method may comprise collecting data and arranging the collected data pertaining to an existing state of the information technology network infrastructure in a first set of templates. The method may further comprise mapping the existing state and a new state of at least one of the at least one server and at least one storage element with an existing set of network elements using the first set of templates to form a second set of templates, wherein the method further comprises of planning the new state of the IT network infrastructure for transformation using the first set of templates and the second set of templates, the new state being an optimized state.

BRIEF DESCRIPTION OF THE DRAWINGS

The foregoing summary, as well as the following detailed description of preferred embodiments, is better understood when read in conjunction with the appended drawings. For the purpose of illustrating the disclosure, there is shown in the drawings example constructions of the disclosure; however, the disclosure is not limited to the specific methods and product disclosed in the drawings.

DETAILED DESCRIPTION

Exemplary embodiments will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

The disclosed embodiments are merely examples, which may be embodied in various forms.

Figure 1:
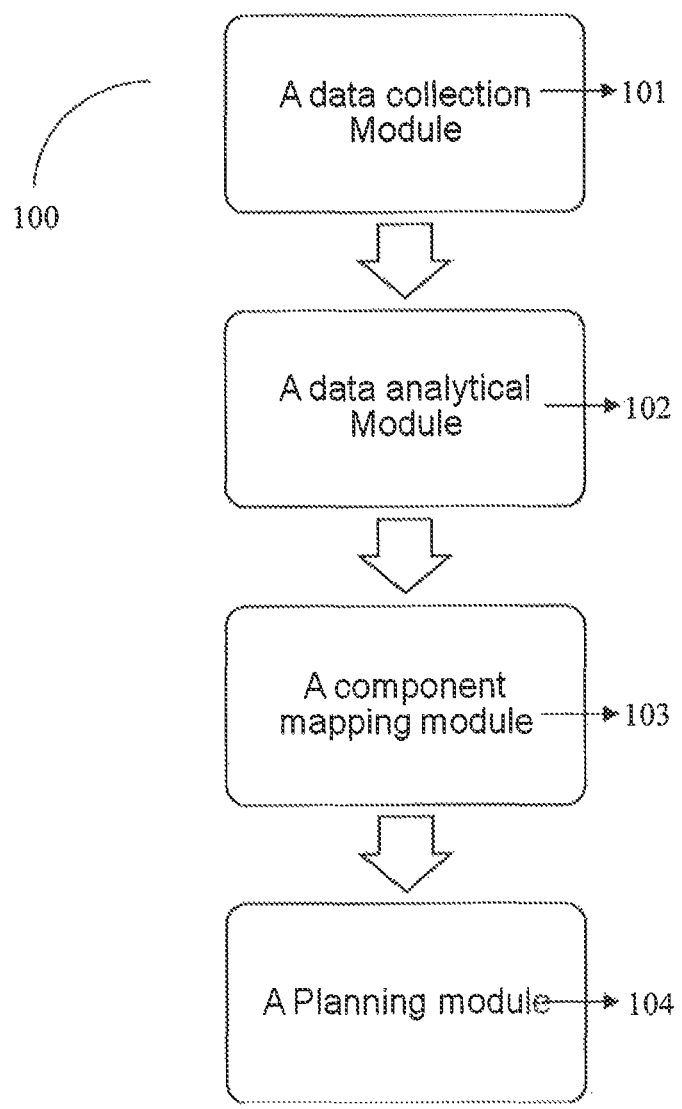
FIG. 1 illustrates a block diagram for the module according to an embodiment.

FIG. 1 illustrates a block diagram for a system according to an exemplary embodiment. According to an exemplary embodiment of the present disclosure, a system (100) is disclosed comprising a data collection module (101), a data analytical module (102), a component mapping module (103), and a planning module (104) each communicably connected with each other.

Figure 2:
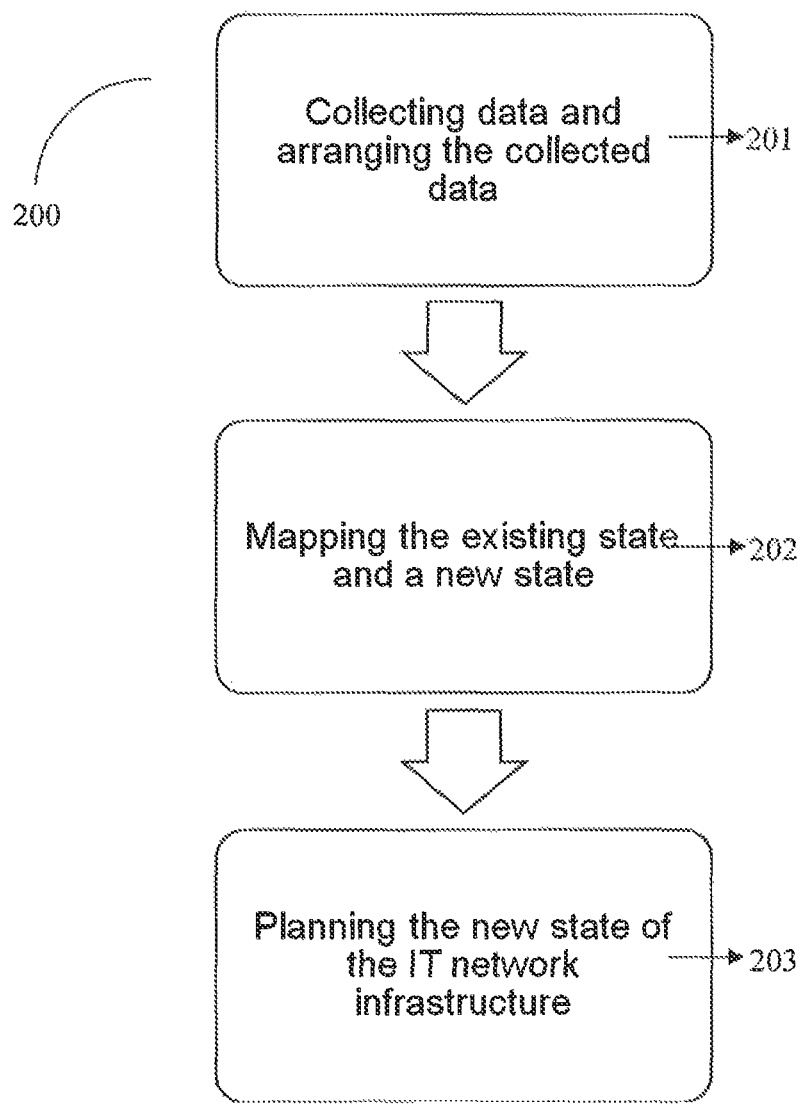
FIG. 2 illustrates a flow diagram for IT infrastructure optimization or transformation.

FIG. 2 illustrates a method (200) that may be executed by system (100) for optimizing distributed enterprise information technology (IT) network infrastructure or network optimization. According to an embodiment, data collection module (101) may be configured to execute a step of collecting data and arranging the collected data (201) for optimizing distributed enterprise information technology (IT) network infrastructure or network optimization. The data collected and arranged may pertain to the existing state of an information technology network infrastructure. The data captured either automatically using tools such as packet analyzers, Netflow analyzers, and Network discovery tool or manually by inspecting or by making suitable assumptions may be arranged into first set of templates. The information gathered in the first set of templates before consolidation, may pertain to at least one server, a plurality of network components, a plurality of applications and at least one data center. Further the data collected for the at least one server may pertain to a number of NIC (network interface controller), device id's of each NIC, ports per NIC, and port bandwidth. Similarly the data collected for the plurality of network components may relate to number of slots per network component, ports per slot, ports bandwidth, and connectivity information. Similarly, for the plurality of applications the data collected may pertain to type of the application, protocols used for communication, number of users supported, and bandwidth per user. Lastly for the at least one data center, data relating to WAN bandwidth associated with each data center, type of consolidation, and expected life years per data center may be aggregated. In cases where the information is not available, data may need to be extracted from the reports/logs pertaining to the network components/applications and missing data may need to be filled with suitable assumptions.

Exemplarily, analytical module (102) and component mapping module (103) may simultaneously perform the method of analyzing, and mapping the existing state and a new state (202) of at least one of the servers and the storage elements with the existing set of network elements. The analytical module (102) may readily absorb the data arranged in the first set of templates. The analytical module (102) and mapping module (103) may determine the existing state of the network by analyzing the collected information. From the information gathered and analyzed about the existing network, a second set of templates may be generated. The second set of templates may contain information about the different network components mapped with their critical parameters such as throughput, ports availability, ports bandwidth. The second set of templates may further generate network topology information. The collected first set of templates may be simultaneously considered with transformation activity in rest of information technology domain before generating the second set of templates. According to an embodiment a critical parameter associated with a network component may be illustrated as follows: critical parameter for LAN in a data center that is captured may be throughput of switch in mpps (Million packets per second), number of 1 and 10 gigabit-per-second ports supported for all the switches existing in the LAN. Further, the critical parameters may map connectivity of servers to access switches, then access switches to upper layer switches.

Planning module (104) may be responsible for planning the new state of the IT network infrastructure (203). The planning module may decide the to-be-state of the network either after transformation or after optimization. The planning module may be adapted to plan post transformational and post optimized state of the information technology network infrastructure depending upon the consolidation strategy of the distributed enterprise information technology network infrastructure derived from the analyzed data and mapped components of the information technology network in order to optimize the network performance. The consolidation strategy may be selected from either consolidation within a data center only or consolidation of data centers. The optimization or transformation may be based on constraints defined by quality of service (QoS) desired by the organization or quality of experience (QoE). According an embodiment the present system disclosed may be configured to analyze and compute the cost associated with the network and the data center. When the consolidation strategy selected enables consolidation within the data center a template may be generated pertaining to the final state of the network by a method, wherein information relating to ports classification and assessment, throughput assessment, industry best network design practices, network infrastructure planning are captured. In another embodiment wherein the consolidation strategy selected refers to consolidation of data centers, information may be captured and a report may be generated that contains number of data centers after consolidation, and set of number of servers moved from different data centers to the target data center.

According to an embodiment of the present disclosure the network optimization and transformation may be enabled by reducing the number of the data centers by consolidating and reducing the server sprawl. After the reduction in the number of data centers is achieved by data center consolidation, data collection module (101) may be configured to perform the step of collecting and arranging data of the existing and new setup. The data may pertain to one or more of internet protocol (IP) traffic pattern, data traffic pattern, and existing network topology. The other information captured may relate to the number of applications and services running, protocols used for communication, QoS requirement of applications, number of users accessing the applications and services, QoE in the current network. Exemplarily, data analytical module and component mapping module may simultaneously perform the step of analyzing the collected data by calculating the average and peak wide area network bandwidth required for the servers. Further the planning module may execute a step of planning post optimized state of the information technology network infrastructure by verifying whether the existing average and peak wide area network bandwidth match with the values determined in the analysis step. When existing average and peak wide area network bandwidth does not match with the values determined in the analysis step the system may look for a solution wherein the solution to upgrade the WAN bandwidth of the network or the possible causes for bottlenecks is determined.

The system 100 may be implemented by a machine which may be a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, the term "machine" shall also be taken to include any collection of machines that individually or jointly execute a set (or multiple sets) of instructions to perform any one or more of the methodologies discussed herein.

The machine may include a processor (e.g., a central processing unit (CPU), a graphics processing unit (GPU, or both), a main memory and a static memory, which communicate with each other via a bus. The machine may further include a video display unit (e.g., a liquid crystal displays (LCD), a flat panel, a solid state display, or a cathode ray tube (CRT)). The machine may include an input device (e.g., a keyboard) or touch-sensitive screen, a cursor control device (e.g., a mouse), a disk drive unit, a signal generation device (e.g., a speaker or remote control) and a network interface device.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein may be intended for operation as software programs running on a computer processor. Furthermore, software implementations can include, but not limited to, distributed processing or component/object distributed processing, parallel processing, or virtual machine processing can also be constructed to implement the methods described herein.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

The preceding description has been presented with reference to various embodiments. Persons skilled in the art and technology to which this application pertains will appreciate that alterations and changes in the described structures and methods of operation can be practiced without meaningfully departing from the principle, spirit and scope.

Exemplary embodiments discussed above may provide a method and system for automating an enterprise network transformation or optimization. They may provide a method and system for automating information technology network infrastructure management process by analyzing the collected data pertaining to the present IT network and taking into account the transformation activity in the overall IT domain. They may provide a method and system that modifies network in order to meet the network performance by computing the LAN and WAN aspects of the network. They may further provide a method and system for transforming or optimizing IT network considering the Quality of Service (QoS)/Quality of Experience (QoE) constraints. They may also provide a method and system for performing approximate cost analysis of the IT network.

Also, disclosed methods and systems may modify the network in order to meet the network performance. The method and system may achieve this by computing the LAN and WAN aspects of the network. According to an embodiment of the present disclosure the system may compute, analyze the existing setup of the network that is the local area network (LAN) or wide area network (WAN) in order to scale up the performance of the network has desired by the CIO.

Exemplary embodiments discussed herein may provide a method and system which uses constraint based optimization techniques to achieve WAN optimization, generate a topology map taking into account the new IT architecture post transformation, including the list of network components to be utilized, and perform both analysis of as-it-is state and transformed state i.e. to-be-states. As a result, several advantages may be achieved in relation to existing technologies. Though not require to practice aspects of the disclosure, these advantages may include:
1. Reducing or eradicating the dependency on a vendor when an organization decides to optimize or transform its existing IT infrastructure.
2. In association with e-Transform tool enabling creation of a robust and scalable network infrastructure.
3. Reducing costs both in terms of operations and in terms of ownership.

What is claimed is:
1. A computer-implemented method for optimizing distributed enterprise information technology (IT) network infrastructure, the method comprising:
  collecting data pertaining to an existing state of the distributed enterprise IT network infrastructure and arranging the collected data in a first set of templates, wherein the first set of templates comprises information pertaining to a wide area network bandwidth and critical parameters associated with a plurality of servers;
  analyzing the collected data pertaining to the existing state of the critical parameters wherein the critical parameters comprise throughput, connectivity, port availability and wide area network bandwidth, wherein analysis of the critical parameters comprises calculating average and peak of the wide area network bandwidth, calculating throughput, determining connectivity, determining port availability;
  mapping the analyzed data pertaining to the existing state to a new state of the plurality of servers, using the first set of templates to form a second set of templates, wherein the second set of templates comprise information about mapping of the plurality of servers with critical parameters;
  optimizing and transforming the new state based on constraints defined by quality of service (OOS) and quality of experience (OoE), wherein the at least one of optimizing and transforming is enabled by reducing number of data centers by a consolidation strategy and reducing server sprawl of the at least one server;
  planning the new state based on the consolidation strategy of the distributed enterprise IT network infrastructure for transformation using the first set of templates and the second set of templates, wherein the new state being one of an optimized state and a transformed state of the IT network infrastructure, wherein the consolidation strategy enables consolidation within the data center to enable generation of a template pertaining to the new state, and wherein consolidation of a set of data centers associated with the distributed enterprise IT network infrastructure enables capturing information and generation of a report containing number of data centers after consolidation;

planning post optimized state and transformed state of the distributed enterprise IT network infrastructure by verifying whether the existing state of the critical parameters match with the values determined in the analyzing step; and modifying the critical parameters and determining bottlenecks when existing value of the critical parameters is different from the analytical derivative of a required value of the critical parameters.

2. The method of claim 1, wherein the optimized state is measured by at least one of QoS, QoE, cost, complexity, and space of the IT Network infrastructure and the optimized IT Network Infrastructure.

3. The method of claim 1, wherein the first set of templates further includes information pertaining to network components, storage devices, applications, switches, port connectivity, and data centers.

4. The method of claim 3, wherein the information pertaining to network components includes at least one of slots per component, ports per slot, ports bandwidth, and connectivity information.

5. The method of claim 3, wherein the information pertaining to applications includes at least one type of the application, protocols used for communication, number of users supported, and bandwidth per user.

6. The method of claim 3, further comprises extracting said information from a report or a log pertaining to the network components or applications when the information is not available directly and filling suitable assumptions is case of missing information.

7. The method of claim 1, wherein the second set of templates includes analyzed data pertaining to the at least network component with their respective critical parameters.

8. The method of claim 7, wherein the critical parameters include at least one of throughput, ports availability, and ports bandwidth.

9. The method of claim 1, wherein consolidating strategy further includes information relating to ports classification and assessment, throughput assessment, industry best network design practices, and network infrastructure planning captured for the new state of the IT network infrastructure.

10. The method of claim 1, wherein the collecting data pertaining to an existing state of the information technology network infrastructure includes one or more of IP traffic pattern, Data traffic pattern, existing network topology, information about number of applications/services running, protocols used for communication, Quality of Service (QoS) requirement of applications, number of users accessing the applications/services, and Quality of Experience (QoE) in the current network.

11. A system for transforming and optimizing distributed enterprise information technology (IT) network infrastructure, the system comprising:
 a hardware processor; and
 a memory storing instructions, the hardware processor configured by the instructions to:
  collect data pertaining to an existing state of the distributed enterprise IT network and arrange said collected data in a first set of templates, wherein the first set of templates comprises information pertaining to a wide area network bandwidth and critical parameters associated with a plurality of servers;
  analyze the collected data pertaining to the existing state of the critical parameters wherein the critical parameters comprise throughput, connectivity, port availability and wide area network bandwidth, wherein analysis of the critical parameters comprises calculating average and peak of the wide area network bandwidth, calculating throughput, determining connectivity, determining port availability;
  map the analyzed data pertaining to the existing state to a new state of the plurality of servers using the first set of templates to form a second set of templates, wherein the second set of templates comprises information about mapping of the plurality of servers with critical parameters;
  optimizing and transforming the new state based on constraints defined by quality of service (OOS) and quality of experience (OoE), wherein the at least one of optimizing and transforming is enabled by reducing number of data centers by a consolidation strategy and reducing server sprawl of the at least one server,
  plan the new state based on the consolidation strategy of the distributed enterprise IT network infrastructure for transformation using the first set of templates and the second set of templates, wherein the new state being one of an optimized state and a transformed state of the IT network infrastructure, wherein the consolidation strategy enables consolidation within the data center to enable generation of a template pertaining to the new state, and wherein consolidation of a set of data centers associated with the distributed enterprise IT network infrastructure enables capturing information and generation of a report containing number of data centers after consolidation;
  plan post optimized state and transformed state of the distributed enterprise IT network infrastructure by verifying whether the existing state of the critical parameters match with the values determined in the analyzing step; and
  modify the critical parameters and determining bottlenecks when existing value of the critical parameters is different from the analytical derivative of a required value of the critical parameters.

12. The system of claim 11, wherein the distributed information technology network infrastructure includes storage devices, and network devices.

13. A non-transitory computer-readable storage medium storing instructions that when executed by a processor enable the processor to execute a method for optimizing distributed enterprise information technology (IT) network infrastructure, the method comprising:
 collecting data pertaining to an existing state of the distributed enterprise IT network infrastructure and arranging the collected data in a first set of templates, wherein the first set of templates comprises information pertaining to a wide area network bandwidth, and critical parameters associated with a plurality of servers;
 analyzing the collected data pertaining to the existing state of the critical parameters wherein the critical parameters comprise throughput, connectivity, port availability and wide area network bandwidth, wherein analysis of the critical parameters comprises calculating average and peak of the wide area network bandwidth, calculating throughput, determining connectivity, determining port availability;

mapping the analyzed data pertaining to the existing state to a new state of the plurality of servers, using the first set of templates to form a second set of templates, wherein the second set of templates comprises information about mapping of the plurality of servers with critical parameters;

optimizing and transforming the new state based on constraints defined by quality of service (OOS) and quality of experience (OoE), wherein the at least one of optimizing and transforming is enabled by reducing number of data centers by a consolidation strategy and reducing server sprawl of the at least one server;

planning the new state based on the consolidation strategy of the distributed enterprise IT network infrastructure for transformation using the first set of templates and the second set of templates, wherein the new state being one of an optimized state and a transformed state of the IT network infrastructure, wherein the consolidation strategy enables consolidation within the data center to enable generation of a template pertaining to the new state, and wherein consolidation of a set of data centers associated with the distributed enterprise IT network infrastructure enables capturing information and generation of a report containing number of data centers after consolidation;

planning post optimized state and transformed state of the distributed enterprise IT network infrastructure by verifying whether the existing state of the critical parameters match with the values determined in the analyzing step; and modifying the critical parameters and determining bottlenecks when existing value of the critical parameters is different from the analytical derivative of a required value of the critical parameters.

* * * * *